United States Patent [19]

Berger et al.

[11] Patent Number: 5,578,804
[45] Date of Patent: Nov. 26, 1996

[54] METAL-ENCLOSED GAS-INSULATED SWITCHING INSTALLATION

[75] Inventors: Ernst Berger, Mellingen; Franz Heil, Baden-Rütihof; Herbert Schifko, Glattbrugg; Piero Tecchio, Oberrohrdorf, all of Switzerland

[73] Assignee: ABB Management AG, Baden, Switzerland

[21] Appl. No.: 412,923

[22] Filed: Mar. 29, 1995

[30] Foreign Application Priority Data

Apr. 19, 1994 [CH] Switzerland .................... 1219/94

[51] Int. Cl.⁶ .................. H01H 33/70; H02B 13/035
[52] U.S. Cl. .................. 218/43; 218/57; 218/68; 218/75; 218/79; 361/605; 361/612; 361/618; 361/621
[58] Field of Search ................ 218/43, 44, 45, 218/57–67, 68, 71, 75; 361/604–621

[56] References Cited

U.S. PATENT DOCUMENTS

| | | | |
|---|---|---|---|
| 2,010,716 | 8/1935 | Goodall et al. | 361/611 |
| 3,654,409 | 4/1972 | Kessler | 218/75 X |
| 3,665,257 | 5/1972 | De Heus | 361/621 X |
| 3,895,202 | 7/1975 | Okerman et al. | 218/60 |
| 4,004,118 | 1/1977 | Boersma et al. | 361/621 X |
| 4,774,628 | 9/1988 | Diaferia et al. | 361/621 |
| 5,298,703 | 3/1994 | Yatsuzuka et al. | 218/44 |
| 5,495,084 | 2/1996 | Meyer et al. | 218/43 |

FOREIGN PATENT DOCUMENTS 2539996  3/1977  Germany.

*Primary Examiner*—J. R. Scott
*Attorney, Agent, or Firm*—Burns, Doane, Swecker & Mathis

[57] ABSTRACT

A metal-enclosed, gas-insulated switching installation includes at least two busbar systems and a circuit breaker. Each circuit breaker is in the form of a pole having a pole axis and at least one extinction chamber, installed in a pole housing. The pole axes are arranged perpendicularly to a foundation and are located in a first plane. The switching installation includes an electrically conductive connection, extending along a connecting axis, of the voltage-carrying extinction chamber of the circuit breaker to each of the busbar systems and an isolator arranged in the connection between the busbar and the circuit breaker pole.

7 Claims, 3 Drawing Sheets

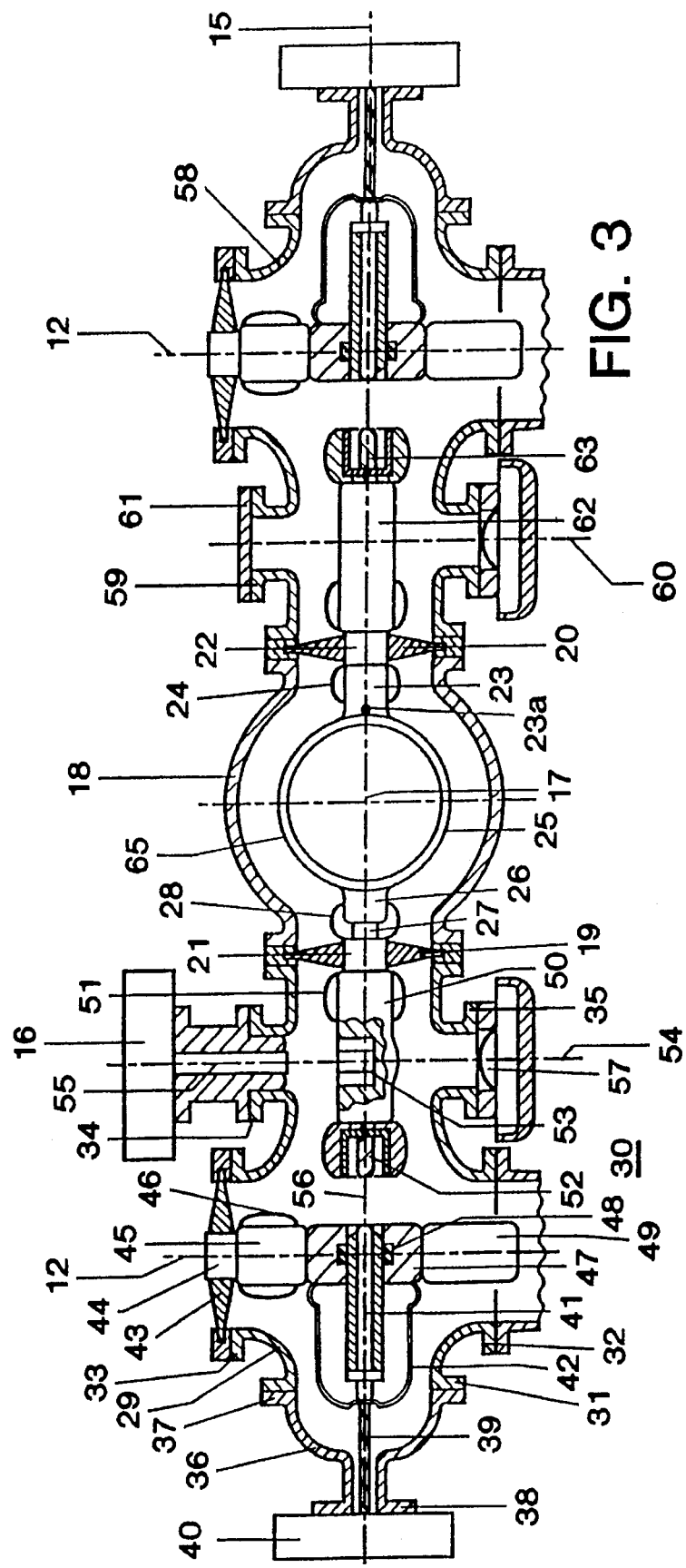

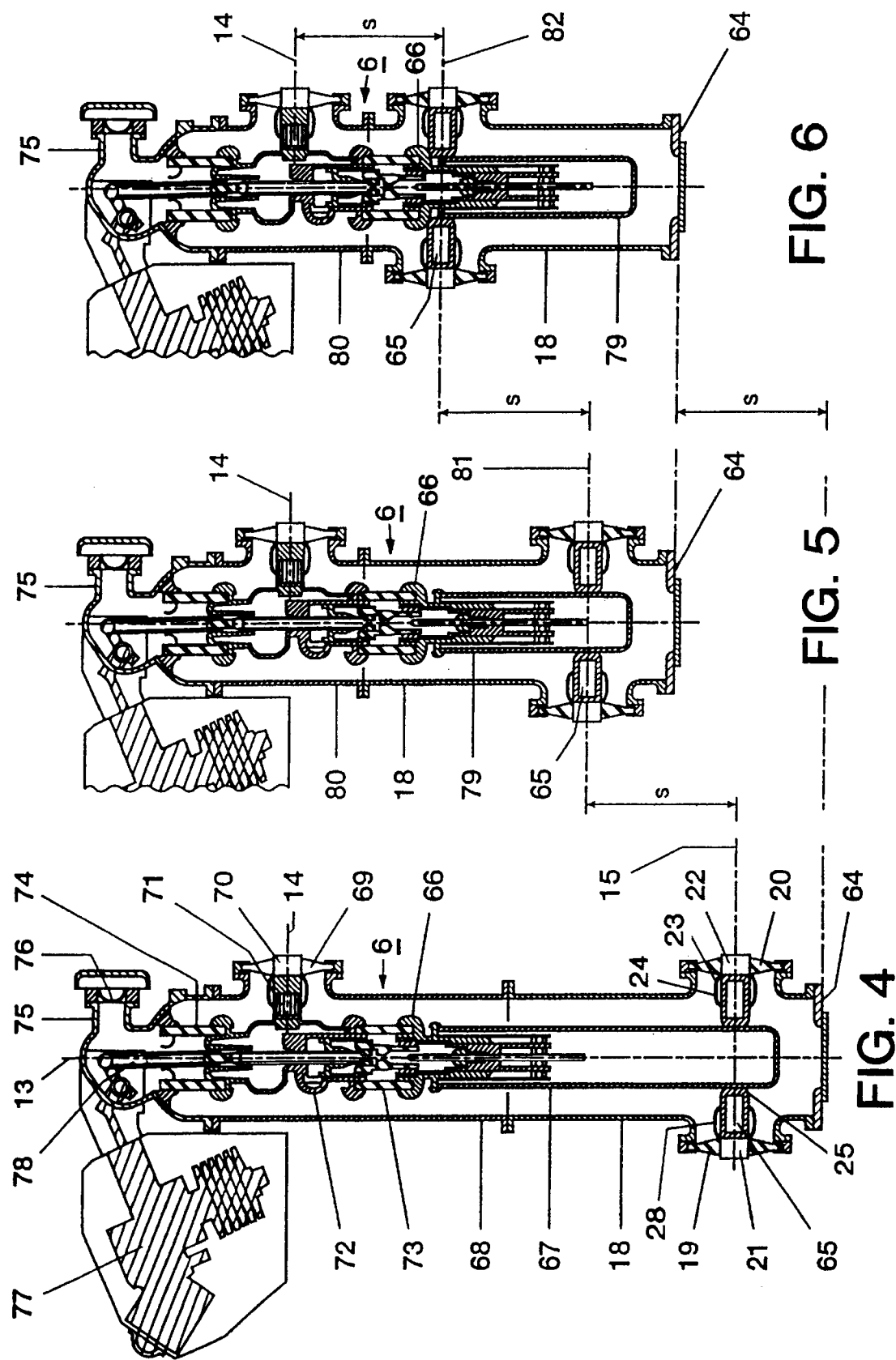

METAL-ENCLOSED GAS-INSULATED SWITCHING INSTALLATION

BACKGROUND OF THE INVENTION

1. Field of the Invention

The invention is based on a metal-enclosed gas-insulated switching installation.

2. Discussion of Background

Single-phase metal-enclosed gas-insulated switching installation is known which exhibits a double busbar system. As a rule, only a first one of the busbar systems is in operation whilst the second one is taken into operation only when inspections or a fault in the area of the first busbar system require this system to be disconnected from the supply.

For an inspection of a circuit breaker pole, for example in one phase of an outgoing line bay, the extinction chamber of the relevant circuit breaker pole is pulled out of the metal pole housing but this is only permissible when the connections of the circuit breaker pole have previously been reliably grounded. This grounding must take place both on the outgoing side and on the busbar side. In a conventional outgoing line bay of a metal-enclosed gas-insulated switching installation which is provided with a double busbar system, one ground electrode is as a rule necessary in each case on both sides of the circuit breaker pole of one phase for the grounding on the busbar side. After the extinction chamber has been pulled out, these two ground electrodes are no longer metallically connected so that proper grounding is only achieved when both ground electrodes, that is to say one on each side of the circuit breaker pole, are closed. Before the ground electrodes are closed, the corresponding busbar isolators which are in each case arranged between the ground electrode and the busbar are naturally open so that the busbars still remain under voltage as before and can ensure undisturbed operation of the parts of the gas-insulated switching installation not affected by the inspection.

If the busbar isolators are constructed as sectionalizing isolators which extend along a connecting axis, this necessitates a comparatively large spacing of the busbars from the circuit breaker poles which results in increased space requirement for the gas-insulated switching installation.

SUMMARY OF THE INVENTION

Accordingly, one object of the invention characterized in the independent claims is to provide a novel metal-enclosed gas-insulated switching installation which requires fewer ground electrodes and which requires especially little space.

This metal-enclosed gas-insulated switching installation exhibits at least two busbar systems and one circuit breaker which exhibits for each pole in each case one pole axis and at least one extinction chamber installed in a pole housing. The pole axes of the circuit breaker are arranged perpendicularly to the surface of a foundation and are located in a first plane. Furthermore, the switching installation in each case exhibits an electrically conductive connection, extending along a connecting axis, of the voltage-carrying extinction chamber of the respective pole to each of the busbar systems and in each case one isolator arranged in the connection between the respective busbar and the pole. This metal-enclosed gas-insulated switching installation requires especially little space. This is achieved by the fact that the busbar axes of the at least two busbar systems extend in parallel with the surface of the foundation and are located in each case in a second and in a third plane which extend in parallel with one another, that the first plane in which the pole axes are located is arranged between the second and the third plane and parallel to these and that the connecting axis extends perpendicularly to these planes.

It is also advantageous both with respect to the cost and with respect to the time consumed by the maintenance work which is always necessary, that in a switching installation equipped with a double busbar system, one of the two busbar ground electrodes needed in the conventional case is not needed in each phase. The omission of one of these ground electrodes has no disadvantageous consequences whatever for the gas-insulated switching installation, neither with respect to the operational dependability nor to the availability of the system.

The extinction chamber of the circuit breaker is designed to be removable in an upward direction out of the pole housing. The circuit breaker is equipped with a separate drive for each pole, which is not arranged axially with respect to the pole axis. The drive is arranged at the top adjacently to the pole housing on the side of the pole housing opposite the outgoing feeder to a cable terminal or to an infeed, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a diagrammatic representation of the section 3—3 entered in FIG. 1, FIG. 4 shows a diagrammatic representation of the section 4—4 entered in FIG. 2, FIG. 5 shows a diagrammatic representation of the section 5—5 entered in FIG. 2, and FIG. 6 shows a diagrammatic representation of section 6—6 entered in FIG. 2.

DESCRIPTION OF THE PREFERRED EMBODIMENTS

Figure 1:
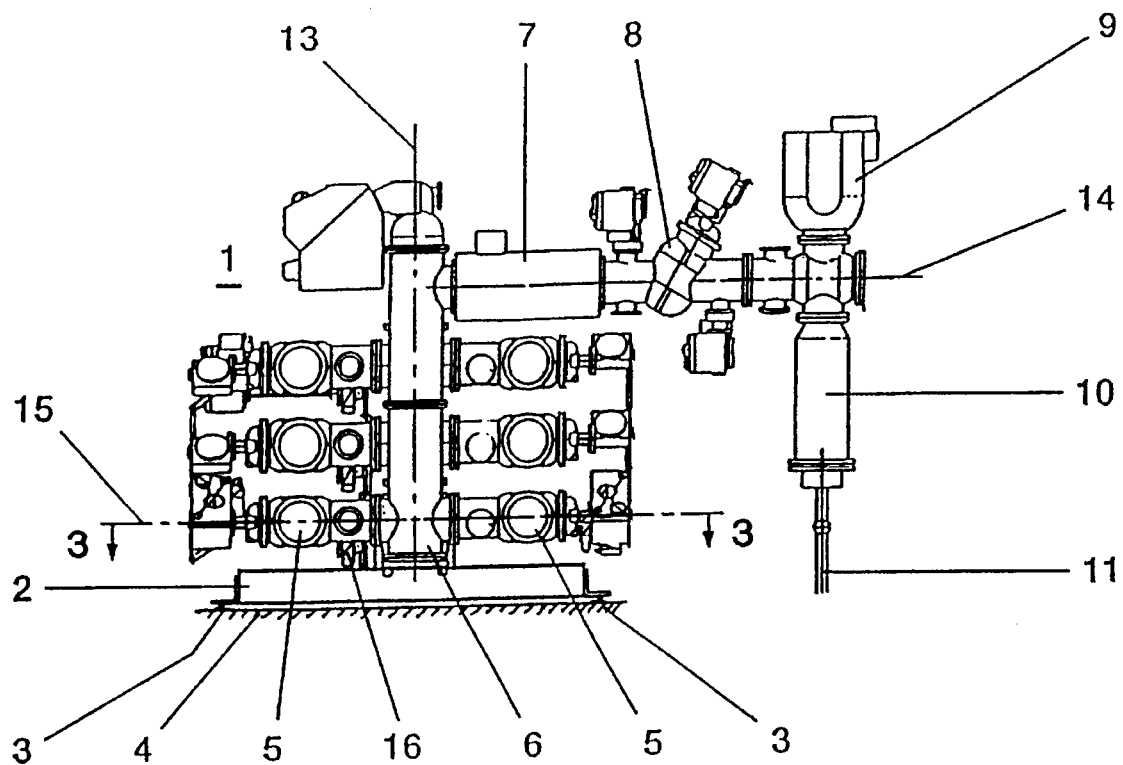
FIG. 1 shows a side view of an outgoing line bay of a gas-insulated switching installation.
Figure 2:
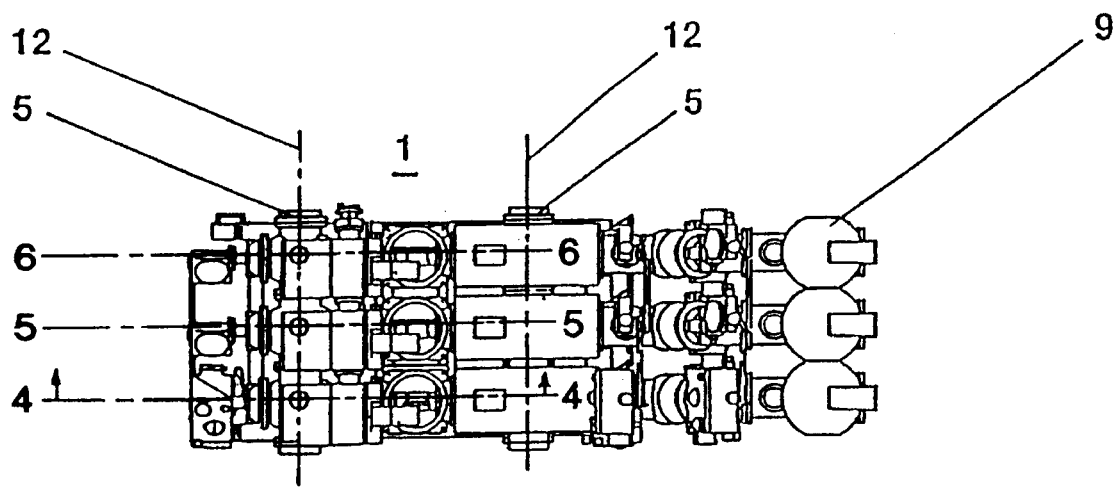
FIG. 2 shows a top view of an outgoing line bay of a gas-insulated switching installation.

Referring now to the drawings, wherein like reference numerals designate identical or corresponding parts throughout the several views, and any elements not required for the direct understanding of the invention are not shown, FIG. 1 shows a diagrammatic side view of an outgoing line bay 1 of a single-phase metal-enclosed gas-insulated switching installation and FIG. 2 shows a top view of this outgoing line bay 1. This outgoing line bay 1 exhibits a supporting frame 2 which is manufactured from a metal section. Especially suitable metal sections which can be used are, for example I-sections or tubular steel sections. As a rule, the tubular sections exhibit a round or a rectangular cross section. On the corners of the supporting frame 2, angle sections 3 are attached which are used for connecting the supporting frame 2 to a foundation 4. This connection can be friction-locked but can also allow a sliding of the supporting frame 2 on a support rail inserted in the foundation 4 and not shown here. In this type of a metal-enclosed and gas-insulated switching installation, the busbars 5 are arranged perpendicularly above one another on one side or on both sides of the upright poles of the circuit breaker 6. The outgoing feeder is provided with a current transformer 7 which is followed by an isolator 8 which takes over the -function of the outgoing isolator. A ground electrode is provided in each case on both sides of the isolator 8. Following the isolator 8, a voltage transformer 9 is provided. A cable terminal 10 connects the outgoing high-voltage cable 11 to the gas-insulated switching installation. A bay provided for an infeed has a similar construction to the outgoing line bay 1 described.

The busbars 5 in each case exhibit one busbar axis 12. The busbar axes 12 of each of the two busbar systems are located perpendicularly above one another in one plane. The poles of the circuit breaker 6 in each case exhibit one pole axis 13. The pole axes 13 of the three circuit breaker poles are located in a plane which is perpendicular to the foundation 4. The planes in which the busbar systems are located and the plane in which the pole axes 13 are located are arranged parallel to one another in this outgoing line bay 1. The part of the outgoing line bay 1 leading away from the respective circuit breaker pole, the current transformer 7, the isolator 8 and the housing to which the cable terminal 10 is flanged extends along a longitudinal axis 14. The longitudinal axis 14 is perpendicular to the respective pole axis 13. The part of the outgoing feeder leading away from the circuit breaker 6 can extend in the direction shown in FIG. 1 but can also extend in the opposite direction. The upper part of the pole housing can be correspondingly aligned during the assembly. As a rule, it is rotated by 180° about the pole axis 13 but it is also possible to turn the upper part of the pole housing away by an angle within the range around 180°. Since the circuit breaker 6 is provided with a separate drive for each pole, each of the poles can have differently aligned outgoing feeders.

In a feeding line bay which is configured similarly to the outgoing line bay 1 and in which the infeed extends along the respective longitudinal axis 14, for example to feed throughs which are connected to an overhead line, this possibility of rotating the upper part of the pole housing has a particularly advantageous effect since phase spacings adequate for introducing the overhead line can be implemented in a simple manner even in switching installations with constricted space conditions.

The connection from the respective circuit breaker pole to the busbars extends along a connecting axis 15. FIG. 1 shows that only one ground electrode 16 is provided for each connection in this outgoing line bay 1 equipped with a double busbar system. In this gas-insulated switching installation, one of the two ground electrodes normally needed in this area is saved without loss of dependability and without reducing the availability of the system. The ground electrode 16 can be optionally installed either on one or the other side of the circuit breaker pole in a switching installation with double busbar system.

If the switching bay is configured as coupler bay, the space provided for the ground electrode on one side of the circuit breaker pole is sufficient for closing the pole housing in a pressure-tight manner with a lid and there is still enough space for the busbar so that the busbar axis 12 can be retained unchanged even in a coupler bay, in comparison with the feeding line and outgoing line bays.

FIG. 3 shows a diagrammatic representation of section 3—3 entered in FIG. 1. The pole axis 13 is perpendicular to the plane of intersection and penetrates the latter at a central point 17. A cylindrically constructed bottom part of the housing 18 which extends along the pole axis 13 is provided with two openings, not designated, which are located on the connecting axis 15 as center and which are in each case flanged shut in a pressure-tight manner with a cylindrically constructed disk-shaped separating insulator 19, 20. The separating insulator 19 exhibits a supply terminal 21 penetrating it in the center. The separating insulator 20 exhibits a supply terminal 22 penetrating it in the center. An electrically conductive link 23 which is surrounded by a dielectrically advantageous shielding 24 is screwed to the supply terminal 22. The link 23 is firmly screwed to a contact ring 25 made of a metal with good electric conductivity. The link 23 and the contact ring 25 can also be constructed in one piece. The contact ring 25 exhibits a contact arrangement 26 screwed to it on the side opposite the link 23. The supply terminal 21 is connected to a contact carrier 27 which is equipped, for example, with spiral contacts. The contact arrangement 26 encloses the contact carrier 27 and forms together with it a detachable plug-in contact which is surrounded by a dielectrically advantageous shielding 28.

The center point of the contact ring 25 coincides with the central point 17. The cylindrically constructed inside surface of the contact ring 25 is provided with at least one groove, not shown, into which a plastic ring, not shown, is glued. When the extinction chamber is installed, the plastic ring guides the electrically conductive exhaust casing of the latter, which is equipped with elastic contact members on the outside, for example with spiral contacts which establish an electrical contact with the contact ring 25 and it prevents the elastic contact members from being subjected to unsymmetrical mechanical loading. The inner opening of the contact ring 25 is completely closed by the exhaust casing connected to the extinction chamber. On the side of the separating insulator 19 opposite the contact carrier 27, the housing 29 of an isolator 30 constructed as angle isolator is flanged on in a pressure-tight manner.

The housing 29 of the isolator 30, shown in a simplified form, exhibits a wall of metal. As a rule, the housing 29 is cast pressure tight from an aluminum alloy. Apart from the opening closed with the separating insulator 19, the housing 29 exhibits five other openings, not designated, provided with flanges 31 to 35. The housing 29 also exhibits a longitudinal axis which coincides with the connecting axis 15. During the isolator assembly, the opening provided with the flange 31 is provided with a metallic cover 36 which exhibits a flange 37 which is screwed to the flange 31 in a gastight manner. Opposite the flange 37, a further flange 38 is attached to the cover 36. The flange 38 is used for mounting a pressure-tight feed through of a rod 39 of insulating material which can be moved in the direction of an actuating axis coinciding with the connecting axis 15 during a switching process of the isolator 30. Driven by an isolator drive 40 also connected to the flange 38, the rod 39 of insulating material moves the moving contact arrangement 41, shown highly diagrammatically, of the isolator 30. The moving contact arrangement 41 is surrounded by a dielectrically effective shielding 42 which is penetrated by the rod 39 of insulating material.

A busbar housing, not designated, is flanged to the flange 32. A separating insulator 43 which is penetrated by a supply terminal 44 is flanged to the flange 33. A conductor section 45 which is sheathed by a dielectrically effective shielding 46 on the insulator side is screwed to the supply terminal 44. The conductor section 45 extends along the busbar axis 12 which extends perpendicularly to the connecting axis 15. The conductor section 45 is electrically conductively connected to a first fixed contact carrier 47 of the isolator 30. A sliding contact 48, which is provided for the transition of current from the moving contact arrangement 41 of the isolator 30 to the contact carrier 47 is inserted into the contact carrier 47. The sliding contact 48 is arranged concentrically to the connecting axis 15 and is provided with contact fingers, with contact laminations or with spiral contacts. The contact carrier 47 is arranged concentrically to the connecting axis 15. At the same time, the contact carrier 47 is constructed as part of the active busbar parts. On the side of the contact carrier 47 opposite the conductor section 45, a further conductor section 49 is attached which extends along the busbar axis 12 through the opening provided by the flange 32. The supply terminal 21 is electrically conductively connected to a second fixed contact carrier 50 of the isolator 30. The end of the contact carrier 50 on the insulator side is covered with a dielectrically effective shielding 51. The end of the contact carrier 50 facing the contact carrier 47 is provided with a counter contact 52, arranged concentrically to the connecting axis 15, for the moving contact arrangement 41 of the isolator 30. The contact carriers 47 and 50 are formed dielectrically advantageously and any edges are rounded off. In operation, the supply terminals 44 and 21 are at high-voltage potential and are insulated from the metal enclosure of the gas-insulated switching installation, In addition, a tulip-shaped counter contact 53 which is arranged concentrically to an installation axis 54 and accommodates the contact pin 55 of the ground electrode 16 when the ground electrode 16 is closed is inserted into the contact carrier 50. The installation axis 54 is perpendicular to the connecting axis 15. There is a gap 56 between the contact carrier 47 and the counter contact 52 when the isolator 30 is open. This gap 56 corresponds to the isolating gap of the isolator 30 which, in operation, withstands all voltage stresses occurring at this point due to the operation.

When the isolator 30 is switched on, the rod 39 of insulating material actuated by the isolator drive 40 moves the moving contact arrangement 41 along the connecting axis 15 towards the counter contact 52. Any pre-arcing between the moving contact arrangement 41 and the counter contact 52, which may be caused by residual charges and/or by an operating-frequency voltage present between the contact carrier 47 and the counter contact 52 is properly controlled by the isolator 30. It is not possible for the preliminary arc to widen towards the wall of the housing 29 because of the geometric arrangement of the contact carrier 47 and the counter contact 52. The isolator drive 40 is designed in such a manner that it reliably moves the moving contact arrangement 41 into the intended turn-on position in any possible operating case so that proper current conduction via the rated-current contacts provided for this purpose and not described in greater detail is ensured. Similarly, the isolator 30 also always opens properly.

The ground electrode 16 is built into the opening provided with the flange 34 in this case. Alternatively, however, it could also be built into the opening provided with the flange 35. On the flange 35, for example, detectors for monitoring the gas-insulated switching installation or, as shown in FIG. 3 a bursting disk 57 which provides for pressure-relief in the housing 29 in the case of a fault, can be flanged on in a pressure-tight manner. The two flanges 34 and 35 have a common installation axis 54.

The housing 58 flanged on the other side of the lower housing part 18 corresponds with almost all installation parts to the housing 29 and its arrangement is only a mirror image of the latter and no ground electrode is installed. The opening provided with a flange 59, into which a ground electrode extending along an installation axis 60 could be installed is closed in a pressure-tight manner by means of a lid 61. Similarly, the counter contact of the ground electrode has not been installed, either. The supply terminal 22 is electrically conductively connected on the side facing away from the link 23 to a contact carrier 62 which carries a counter contact 63 of the isolator arranged on the right. No second ground electrode needs to be installed here since the counter contact 63 and the contact carrier 62 are always at the same potential as the contact carrier 50 and counter contact 52 due to the electrically conductive contact ring 25 so that it is quite sufficient for these active parts to be jointly reliably grounded with the aid of the single ground electrode 16, when required.

The isolator 30 can be installed in any installation position which is given by the system concept of the metal-enclosed gas-insulated switching installation. The ground electrode 16 can also be operated independently of position so that it does not impose any restrictions to installation, either. The ground electrode 16 can be constructed both as maintenance grounding switch or as high-speed grounding switch. The assembly of isolators 30 preceded by ground electrode 16 is of very compact construction and requires especially little space in the direction of the connecting axis 15 so that the switching bay can be constructed with especially small dimensions.

The open isolating gap of the isolator is highly reliably insulated by means of $SF_6$. In the closed state, the isolator has an optimum rated-current carrying capability, very good short-circuit current carrying capability and surge resistance. In addition, it exhibits reliable switching capability with small capacitive currents and also manages switch-over with no-break change of busbars.

The isolator 30 exhibits separate contact systems for the continuous conduction of current and for the actual switching process. The continuous-current contacts are of simple and reliable construction and exhibit a minimum number of individual parts. The contacts are moved by means of an electrically operated isolator drive arranged outside the $SF_6$-gas-filled isolator housing but the isolator can also be operated manually. Such a configuration very advantageously facilitates the maintenance work. The isolator is provided with a mechanically coupled position indicator and in addition a viewing glass can be provided for an endoscope for checking the position of the contacts.

FIG. 4 shows a greatly simplified diagrammatic representation of section 4—4 entered in FIG. 2 through a first pole of the circuit breaker 6. This pole exhibits a metallic pole housing which is filled with insulating gas and which is composed of a number of components which are connected to one another in a pressure-tight manner. The pole housing exhibits a lower housing part 18 closed at the bottom with a lid flange 64, which is of equal construction in all three poles of a three-pole circuit breaker 6 but which is used in a different installation position. A contact assembly 65 is in each case installed in the lower housing part 18. This contact assembly 65 in each case consists of the parts described in conjunction with FIG. 3, such as the link 23 with the shielding 24, the contact ring 25, the contact arrangement 26 and the contact carrier 27 with the shielding 28. The contact assembly 65 is connected, on the one hand, so as to be pluggable to the supply terminal 21 of the separating insulator 19 and, on the other hand, permanently connected to the supply terminal 22 of the separating insulator 20. The circuit breaker pole exhibits an extinction chamber 66 which exhibits a cylindrically constructed exhaust casing 67 which is made of metal and is arranged concentrically to the pole axis 13 and which is moved into the contact assembly 65 and is electrically conductively connected to the latter via sliding contacts such as, for example, spiral contacts. The exhaust casing 67 transfers the potential of the contact assembly 65 to the lower part of the extinction chamber 66 and at the same time carries the operating current when the circuit breaker pole is closed.

An upper housing part 68 which exhibits an opening, not designated, which is closed in a pressure-tight manner by means of a separating insulator 69, is placed onto the lower housing part 18. The separating insulator 69 exhibits a supply terminal 70 which penetrates it and which, on the one hand, is electrically conductively connected to the active parts, not shown, of the outgoing feeder, extending in the direction of the longitudinal axis 14 and which, on the other hand, is connected to the upper part 72 of the extinction chamber 66 via a blade contact 71. The upper part 72 and the lower part of the extinction chamber 66 are connected by an extinction chamber insulator 73 to form one unit. When the circuit breaker pole is disconnected, the extinction chamber insulator 73 insulates the upper part 72 from the lower part. The extinction chamber 66 is connected by means of a holding insulator 74 to a housing lid 75 which holds it in the center of the pole housing. The housing lid 75 is connected to the upper housing part 68 and closes off the pole housing towards the top. The housing lid 75 is provided with a bursting disk 76 which allows excess pressure arising in the pole housing to escape into the environment in an emergency case. A drive 77 for the circuit breaker pole is flanged to the housing lid 75. The drive 77 is not located on the pole axis 13, it is arranged next to the pole housing on the side of the pole housing opposite the outgoing feeder to the cable terminal 10. Thus, the constructional height of the circuit breaker pole is not increased by the drive 77, or only insignificantly so. The drive 77 acts, via a diagrammatically indicated power transmission, on an insulating actuating rod 78 which moves the moving contact parts of the extinction chamber 66 along the pole axis 13. During the assembly, the extinction chamber 66 hanging from the housing lid 75 is inserted into the pole housing from the top in such a manner that the exhaust casing 67 attains proper contact with the contact assembly 65 and that the blade contact 71 also reliably electrically connects the active parts of the outgoing feeder to the upper part 72 of the extinction chamber 66.

FIG. 5 shows a diagrammatic representation of section 5—5 entered in FIG. 2 through a second circuit breaker pole. This circuit breaker pole also exhibits a metallic pole housing filled with insulating gas, which is composed of a number of components which are connected to one another in a pressure-tight manner. In this pole, the longitudinal axis 14 of the outgoing feeder is at the same height as in the pole previously described. This pole housing exhibits a lower housing part 18 closed at the bottom with a lid flange 64, which is of identical construction in all three poles of the three-pole circuit breaker 6. In this case, it is installed in the same installation position as in the pole according to FIG. 4. In this case, the same contact assembly 65 is installed in the lower housing part 18. The contact assembly 65 establishes the electrically conductive connection to an exhaust casing 79. The lower housing part 18 is connected to an upper housing part 80. The upper housing part 80 is constructed to be shorter than the corresponding upper housing part 68 in FIG. 4, and the exhaust casing 79 is constructed to be shorter than the corresponding exhaust casing 67 in FIG. 4, in each case by an equal dimension s. The dimension s corresponds to the perpendicular axial spacing of the busbars 5. The other constructional elements of the two switch poles of the circuit breaker 6 are of identical construction.

The result of shortening the above-mentioned components by the dimension s is that the circuit breaker pole according to FIG. 5 is shorter by just this dimension s and that the busbar terminal of this pole, which extends along a connecting axis 81, is offset towards the top by the dimension s compared with the connecting axis 15.

FIG. 6 shows a diagrammatic representation of section 6—6, entered in FIG. 2, through a third pole of the circuit breaker 6. This circuit breaker pole exhibits a metallic pole housing filled with insulating gas which is composed of a number of components which are connected to one another in a pressure-tight manner. In this pole, the longitudinal axis 14 of the outgoing feeder is at the same height as in the two poles described before. The pole housing exhibits a lower housing part 18, which is closed at the bottom with a lid flange 64 and which is of exactly the same construction in all three poles of the three-pole circuit breaker 6 but which is used rotated by 180° in this pole compared with the installation position in the other two circuit breaker poles. A contact assembly 65 is in each case installed in the lower housing part 18. This pole, too, is shorter by the dimension s compared with the pole according to FIG. 4.

The result of rotating the lower housing part 18 by an angle of 180° around an axis extending parallel to the connecting axis 82 is that the busbar terminal of this pole, which extends along a connecting axis 82, is offset towards the top by twice the dimension s compared with the connecting axis 15 and is offset towards the top by just this dimension s compared with the connecting axis 81. The connecting axis 82 exhibits a distance corresponding to the dimension s from the longitudinal axis 14 which is arranged at the same height in all three circuit breaker poles.

As can be seen from FIG. 1, the pole according to FIG. 4 is mounted on the supporting frame 2. The other two poles, which are in each case shorter by the dimension s, are mounted on a pedestal, not shown, which is connected to the supporting frame 2 and which is of such a height that the abovementioned difference in dimensions is equalized. The pedestal is welded together of section iron, is very inexpensive and can be produced with little expenditure. Apart from the pedestal, the upper housing part 68 lengthened by the dimension s and the exhaust casing 67, also lengthened by the dimension s, no other modified components are necessary for rendering superfluous complex links, which are of different length and are always used in a metal-enclosed gas-insulated switching installation of conventional construction, between the circuit breaker poles and the busbars associated with these.

In the metal-enclosed gas-insulated switching installation according to the invention, the pole axes 13 are arranged in one plane. The pole axes 13 extend perpendicularly to the foundation 4. The busbar axes 12 of a busbar system are also arranged in one plane perpendicular to the foundation 4 but the busbar axes 12 extend parallel to the surface of the foundation 4. If a gas-insulated switching installation with only one busbar system is produced, this can be arranged optionally on one or the other side of the plane of the pole axis 13 of the circuit breaker 6. For special applications, it is also possible to carry only one of the busbars of the system on the opposite side of the plane of the pole axes 13. If the gas-insulated switching installation is equipped with a double busbar system, the busbar systems are arranged, as a rule, on both sides of the plane of the pole axes 13 of the circuit breaker 6 and with equal spacing from the latter. This allocation of the busbars 5 in planes parallel to the pole axes 13 of the circuit breaker 6 provides for an arrangement of the busbar terminals which especially saves space and they can be arranged on a diagonal.

A particularly compact arrangement of the gas-insulated switching installation is obtained when the distance between adjacent busbar axes 12, which corresponds to the dimension s, is selected to be the same as the distance between adjacent pole axes 13. The connecting line between the connecting axes 15, 81 and 82 then exhibits an angle of 45° with respect to the direction of the busbar axes 12. This arrangement of the terminals results in increased flexibility in planning metal-enclosed gas-insulated switching installations and also in an advantageous reduction in the number of components needed for these gas-insulated switching installations.

The changes in the constructional length of the pole housing of the pole according to FIG. 4 described can also be achieved in another way. Instead of the extended upper housing part 68, a shorter upper housing part 80 can also be installed, for example, as it is used in the other two poles but then either the lower housing part must be correspondingly extended towards the top in this pole or a correspondingly dimensioned intermediate ring must be inserted between the shorter upper housing part 80 and the lower housing part 18.

Obviously, numerous modifications and variations of the present invention are possible in light of the above teachings. It is therefore to be understood that within the scope of the appended claims, the invention may be practiced otherwise than as specifically described herein.

What is claimed is:

1. A metal-enclosed, gas-insulated switching installation, comprising:

at least two busbar systems, the busbar systems each lying in planes extending in a first direction;

a circuit breaker, the circuit breaker including a pole having a pole axis extending in a second direction perpendicular to the first direction, the pole being disposed between the two busbar systems, and a removable extinction chamber;

an electrically conductive connection between the two busbar systems, the electrically conductive connection extending along a connecting axis perpendicular to the second direction, the electrically conductive connection including an isolator for each busbar system, and a contact assembly electrically connecting the isolators, the contact assembly including a contact ring electrically connected to the isolators, the contact ring being concentric with the pole axis and electrically connectable and disconnectable to the extinction chamber.

2. The metal-enclosed, gas-insulated switching installation as set forth in claim 1, further comprising an exhaust casing, the exhaust casing being electrically connectable and disconnectable to the extinction chamber and the contact ring contacting the exhaust casing and being electrically connectable and disconnectable to the extinction chamber through the exhaust casing.

3. The metal-enclosed, gas-insulated switching installation as set forth in claim 1, wherein the isolators each includes a counter contact on a circuit breaker side of the isolators such that the counter contacts of the isolators are always at the same potential, and a sliding contact movable into and out of contact with the counter contact, the metal-enclosed, gas-insulated switching installation including at least one ground electrode electrically connectable and disconnectable to the isolator, the ground electrode being arranged between the pole and the counter contact of at least one of the isolators.

4. The metal-enclosed, gas-insulated switching installation as set forth in claim 1, wherein the pole includes a pole housing having a removable top portion, the extinction chamber being removable from the pole housing when the removable top portion is removed from the pole housing.

5. The metal-enclosed, gas-insulated switching installation as set forth in claim 1, wherein the extinction chamber includes movable contact parts, each circuit breaker including a drive for the movable contact parts, the drive being non-coaxial with the pole.

6. The metal-enclosed, gas-insulated switching installation as set forth in claim 5, wherein the pole includes a pole housing, the metal-enclosed, gas-insulated switching installation further comprising a feeder to a cable terminal, the feeder being mounted proximate a top of the pole housing and extending substantially perpendicularly from the pole housing, the drive being mounted proximate the top of the pole housing on a side thereof opposite the feeder.

7. The metal-enclosed, gas-insulated switching installation as set forth in claim 1, wherein the isolators are angle isolators.

* * * * *